United States Patent Office 3,637,851
Patented Jan. 25, 1972

3,637,851
N - CYCLOALKYL-CHLOROBENZYLIDENIMINES AND HERBICIDAL COMPOSITIONS CONTAINING SAME
Edmund J. Rumanowski, Dover, N.J., assignor to Tenneco Chemicals, Inc.
No Drawing. Filed Oct. 18, 1967, Ser. No. 676,052
Int. Cl. C07c 119/00
U.S. Cl. 260—566 F   8 Claims

ABSTRACT OF THE DISCLOSURE

N-cycloalkyl-chlorobenzylidenimines are effective selective herbicides. Illustrative of these herbicidal compounds are N-cyclohexyl-2,3,6-trichlorobenzylidenimine, N-cyclohexylmethyl-2,3,6-trichlorobenzylidenimine, and N-cycloheptyl-2,3,6-trichlorobenzylidenimine. These compounds are prepared by the reaction of equivalent amounts of a chlorobenzaldehyde and a cycloalkyl amine at about 60° to 100° C.

This invention relates to N-cycloalkylchlorobenzylidenimines and to a method for their preparations. It further relates to herbicidal compositions containing these compounds as their herbicidally-active component and to their use in the control of plant growth.

The herbicidal compounds of this invention are N-cycloalkyl-chlorobenzylidenimines that have the structural formula

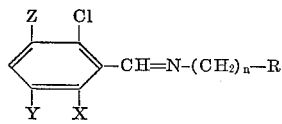

wherein X represents chlorine, hydrogen, an alkyl group having 1 to 4 carbon atoms, or an alkoxy group having 1 to 4 carbon atoms; Y and Z each represents hydrogen, chlorine, nitro, or amino; $n$ represents an integer in the range of zero to four; and R represents a monocyclic or bicyclic aliphatic group, such as cyclopropyl, cyclobutyl, cyclohexyl, cycloheptyl, cyclooctyl, norbornyl, and the like. The preferred compounds for use as selective herbicides are those in which X represents chlorine and Y and Z represent either hydrogen or chlorine. The most active of these compounds as selective herbicides are those in which X and Y represent chlorine and Z represents hydrogen.

Illustrative of the compounds of this invention are the following:

N-cyclohexyl-2-chlorobenzylidenimine,
N-cyclopropyl-2,6-dichlorobenzylidenimine,
N-cyclobutylmethyl-2,6-dichlorobenzylidenimine,
N-cyclooctyl-2,3-dichloro-6-methylbenzylidenimine,
N-cyclohexylbutyl-2,3,5-trichloro-6-methoxybenzylidenimine,
N-cyclooctylpropyl-2,6-dichloro-3,5-dinitro-benzylidenimine,
N-norbornylbutyl-2,3,5,6-tetrachlorobenzylidenimine,
N-norbornyl-2,5-dichloro-3-amino-6-butoxybenzylidenimine,
N-cycloheptylmethyl-2,3,6-trichloro-5-nitrobenzylidenimine,
N-cycloheptylbutyl-2,3-dichloro-6-butylbenzylidenimine,
N-[bicyclo (2.2.1) heptylmethyl]-2,3,5,6-tetrachlorobenzylidenimine,
and the like.

The novel compounds of this invention may be prepared by any suitable and convenient procedure. For example, they may be prepared by the reaction of a chlorobenzaldehyde with a substantially equivalent amount of a cycloalkyl amine at a temperature in the range of about 60° to 100° C. If desired, a small excess of either the aldehyde or the amine may be used. The reaction is generally carried out in a solvent, such as ethanol or propanol.

The N-cycloalkyl-chlorobenzylidenimines have unusual and valuable activity as selective herbicides. In addition certain of these compounds also have fungicidal and bactericidal activity.

The N-cycloalkyl-chlorobenzylidenimines may be applied to the soil or other medium normally supporting plant growth to control or inhibit the growth of plants therein, or they may be applied to the plants to control their growth. They can be used to control weed growth in an area containing a crop, or they can be used to keep an area free from all plant growth.

While the herbicidal compounds may be applied as such for the control of plant growth, they are ordinarily and preferably used in combination with an inert diluent or carrier to make it easier to measure accurately and apply evenly the small amounts of the compounds that are required to inhibit plant growth as well as to apply them in a form that will be readily dispersed through the soil and/or absorbed by the plants. The compounds may be dispersed in water with or without the aid of a wetting agent and the resulting aqueous dispersions employed as sprays. Alternatively, the compounds may be used as the active herbicidal constituent in ketone, alcohol, ether, or hydrocarbon solutions or in oil-in-water emulsions. The compounds may also be mixed with or deposited upon finely-divided solid carriers, such as talc, clay, diatomaceous earth, silica, walnut shell flour, and the like, and employed as dusts. The concentration of the herbicidal compound in the composition may vary widely and depends upon a number of factors, the most important of which are the amount of the composition to be applied per unit of area and the type or types of plants being treated. In most cases the herbicidal compositions are applied as sprays or dusts that contain from about 0.1 percent to 50 percent, and preferably 0.2 percent to 10 percent by weight of an N-cycloalkyl-chlorobenzylidenimine. The amount of the herbicidal composition that is used is that which will apply about 1 pound to 25 pounds of the herbicidal compound per acre. Mixtures of two or more of the N-cycloalkyl-chlorobenzylidenimines may be used in the preparation of the herbicidal compositions; if desired, the compositions may also contain other herbicides, fungicides, or insecticides.

The invention is further illustrated by the examples that follow. In these examples, all percentages are percentages by weight.

EXAMPLE 1

A reaction mixture containing 14.8 grams (0.07 mole) of 2,3,6-trichlorobenzaldehyde, 8.0 grams (0.08 mole) of cyclohexylamine, and 125 ml. of ethanol was heated at its reflux temperature for 2 hours, then cooled to −40° C. and filtered. The reaction mixture was diluted with 400 ml. of water and filtered. The crude product that was obtained was extracted with 100 ml. of petroleum ether (20°–40° C.), washed with 100 ml. of water, dried with anhydrous magnesium sulfate, and stripped of solvent. There was obtained 10 grams of N-cyclohexyl-2,3,6-trichlorobenzylidenimine, which melted at 38°–43° C. and which contained 37.2% Cl, 4.83% N, 55.1% C, and 4.94% H (calculated, 36.7% Cl, 4.82% N, 53.8% C, and 4.83% H). Infrared analysis of the product indicated the presence of the imine grouping.

EXAMPLE 2

A reaction mixture containing 14.7 grams (0.07 mole) of 2,3,6-trichlorobenzaldehyde, 7.91 grams (0.07 mole) of cyclohexylmethylamine, and 100 ml. of ethanol was heated at its reflux temperature for one hour and then cooled to room temperature. The reaction mixture was diluted with 400 ml. of water and filtered, and the crude product obtained was dried and recrystallized from ethanol. The N-cyclohexylmethyl-2,3,6-trichlorobenzylidenimine obtained melted at 54°–56° C. and contained 34.7% Cl, 4.75% N, 55.7% C, and 5.23% H (calculated, 34.9% Cl, 4.59% N, 55.1% C, and 5.23% H). Infrared analysis of the recrystallized product indicated the presence of the imine grouping.

EXAMPLE 3

The procedure of Example 1 was repeated using 21 grams (0.1 mole) of 2,3,6-trichlorobenzaldehyde, 15.5 grams (0.1 mole) of 4-cyclohexylbutylamine, and 100 ml. of ethanol. The N-(4-cyclohexylbutyl)-2,3,6-trichlorobenzylidenimine, which was obtained in a 71% yield, was an oil that contained 30.1% Cl, 3.93% N, 60.4% C, and 6.43% H (calculated, 30.7% Cl, 4.03% N, 58.8% C, and 6.31% H).

EXAMPLE 4

The procedure of Example 1 was repeated using 9.0 grams (0.08 mole) of cycloheptylamine instead of the cyclohexylamine. The N-cycloheptyl-2,3,6-trichlorobenzylidenimine obtained contained 35.7% Cl, 4.57% N, 55.8% C, and 5.30% H (calculated, 35.0% Cl, 4.61% N, 55.3% C, and 5.30% H). Infrared analysis of the product indicated the presence of the imine grouping.

EXAMPLE 5

The procedure of Example 1 was repeated using 21 grams (0.1 mole) of 2,3,6-trichlorobenzaldehyde, 12.7 grams (0.1 mole) of cyclooctylamine, and 150 ml. of ethanol. The N-cyclooctyl-2,3,6-trichlorobenzylidenimine, which was obtained in a 84% yield, was an oil that contained 32.9% Cl, 4.32% N, 57.3% C, and 5.74% H (calculated, 33.4% Cl, 4.40% N, 56.4% C, and 5.70% H).

EXAMPLE 6

A reaction mixture containing 14.1 grams (0.1 mole) of o-chlorobenzaldehyde, 16.2 grams (0.1 mole) of endo-2-aminomethylbicyclo(2.2.1)heptane, 5.4 grams (0.1 mole) of sodium methoxide, and 100 ml. of ethanol was heated at its reflux temperature for one hour and then cooled to room temperature. The reaction mixture was diluted with 400 ml. of water. The oil that separated was extracted with 100 ml. of isopropyl ether, dried over magnesium sulfate, and filtered. When the isopropyl ether had been removed from the solution, there was obtained 19 grams of N - [endo - 2-bicyclo(2.2.1)heptylmethyl]-2-chlorobenzylidenimine, which was an oil that contained 13.8% Cl, 5.65% N, 73.5% C, and 7.34% H (calculated, 14.3% Cl, 5.64% N, 72.5% C, and 7.26% H).

EXAMPLE 7

The procedure described in Example 6 was repeated using 10.5 grams (0.05 mole) of 2,3,6-trichlorobenzaldehyde, 8.1 grams (0.05 mole) of endo-2-amino-methylbicyclo(2.2.1) heptane, 10.8 grams (0.05 mole) of a 25% solution of sodium methoxide in methanol, and 100 ml. of ethanol. There was obtained a 50% yield of N-[endo-2-bicyclo(2.2.1)heptylmethyl] - 2,3,6 - trichlorobenzylidenimine, which was an oil that contained 33.2% Cl, 5.3% N, 56.8% C, and 5.1% H (calculated, 33.6% Cl, 4.4% N, 56.8% C, and 5.0% H). Infrared analysis of the product indicated the presence of the imine grouping.

EXAMPLE 8

The procedure described in Example 6 was repeated using 21.0 grams (0.1 mole) of 2,3,6-trichlorobenzaldehyde, 14.8 grams (0.1 mole) of 2-norbornylamine hydrochloride, 5.4 grams (0.1 mole) of sodium methoxide, and 100 ml. of ethanol. There was obtained a 57% yield of N-(2-norbornyl)-2,3,6-trichlorobenzylidenimine, an oil that contained 36.2% Cl, 4.46% N, 57.7% C, and 4.63% H (calculated, 35.2% Cl, 4.63% N, 55.6% C, and 4.63% H).

EXAMPLE 9

Acetone solutions were prepared by dissolving 100 mg. portions of the products of Examples 1–8 in 10 ml. portions of acetone that contained 2000 p.p.m. of sorbitan trioleate and 5000 p.p.m. of a polyoxyethylene ether of sorbitan monooleate. The acetone solutions were dispersed in 90 ml. of portions of distilled water to form aqueous solutions that contained 0.1 percent of the N-cycloalkyl-chlorobenzylidenimines.

EXAMPLE 10

Series of tests were carried out in which the products of Examples 1–8 were evaluated as preemergence and postemergence selective herbicides. In the preemergence tests, solutions prepared by the procedure described in Example 9 were applied to groups of flats containing soil in which had been planted seeds of various plant species. The results of the tests were observed 10 days after the treatment. The postemergence tests were carried out by spraying seedlings of various plant species with solutions of the N-cycloalkyl-chlorobenzylidenimines and observing the results 43 days after this treatment. In both series of tests the solutions were used in amounts that supplied 0.31 pound to 20 pounds of the test compound per acre.

In Table I a numerical scale is used to show the herbicidal activity of the test compounds. On this scale, "1" indicates no injury to the plants; "2" indicates slight injury; "3" indicates moderate injury; "4" indicates severe injury; and "5" indicates that all of the plants were killed.

TABLE I.—HERBICIDAL ACTIVITY OF N-CYCLOALKYL-CHLOROBENZYLIDENIMINES

| | Plant species | | | | | | | | | | | |
|---|---|---|---|---|---|---|---|---|---|---|---|---|
| | Clover | Soy bean | Sugar beet | Cotton | Corn | Oats | Mustard | Morning glory | Buckwheat | Rye grass | Crab grass | Yellow fox tail |
| Product of Ex. 1: | | | | | | | | | | | | |
| Preemergence (lb./acre): | | | | | | | | | | | | |
| 20 | 5 | 5 | 4 | 1 | 1 | 1 | 3 | 5 | 4 | 4 | 5 | 4 |
| 10 | 5 | 5 | 3 | 1 | 1 | 1 | 3 | 5 | 4 | 4 | 5 | 2 |
| 5 | 5 | 2 | 3 | 1 | 1 | 1 | 2 | 5 | 4 | 1 | 3 | 1 |
| 2.5 | 5 | 2 | 3 | 1 | 1 | 1 | 5 | 5 | 2 | 1 | 2 | 1 |
| 1.25 | 3 | 1 | 1 | 1 | 1 | 1 | 2 | 1 | 1 | 1 | 2 | 1 |
| 0.625 | 2 | 1 | 1 | 1 | 1 | 1 | 1 | 1 | 1 | 1 | 2 | 1 |
| 0.3 | 1 | 1 | 1 | 1 | 1 | 1 | 1 | 1 | 1 | 1 | 1 | 1 |
| Postemergence (lb./acre): | | | | | | | | | | | | |
| 20 | 5 | 5 | 5 | 3 | 5 | 3 | 5 | 5 | 5 | 2 | 3 | 4 |
| 10 | 5 | 5 | 5 | 3 | 5 | 3 | 4 | 5 | 5 | 2 | 3 | 3 |
| 5 | 4 | 5 | 5 | 3 | 2 | 2 | 2 | 2 | 5 | 2 | 3 | 2 |
| 2.5 | 4 | 3 | 3 | 2 | 2 | 2 | 1 | 1 | 2 | 2 | 1 | 1 |
| Product of Ex. 2: | | | | | | | | | | | | |
| Preemergence (lb./acre): | | | | | | | | | | | | |
| 20 | 5 | 4 | 4 | 4 | 4 | 4 | 4 | 5 | 5 | 4 | 4 | 4 |
| 10 | 5 | 3 | 3 | 2 | 1 | 1 | 4 | 5 | 5 | 1 | 4 | 1 |
| 5 | 5 | 3 | 3 | 2 | 1 | 1 | 1 | 5 | 2 | 1 | 4 | 1 |
| 2.5 | 4 | 3 | 3 | 2 | 1 | 1 | 1 | 3 | 2 | 1 | 3 | 1 |
| 1.25 | 2 | 1 | 2 | 2 | 1 | 1 | 1 | 1 | 1 | 1 | 1 | 1 |

TABLE I—Continued

| | Clover | Soy bean | Sugar beet | Cotton | Corn | Oats | Mustard | Morning glory | Buck-wheat | Rye grass | Crab grass | Yellow fox tail |
|---|---|---|---|---|---|---|---|---|---|---|---|---|
| Product of Ex. 2: | | | | | | | | | | | | |
| Postemergence (lb./acre): | | | | | | | | | | | | |
| 20 | 5 | 5 | 5 | 5 | 3 | 3 | 3 | 5 | 5 | 3 | 5 | 4 |
| 10 | 5 | 5 | 5 | 4 | 3 | 3 | 3 | 3 | 5 | 2 | 3 | 3 |
| 5 | 4 | 5 | 4 | 3 | 3 | 2 | 3 | 3 | 5 | 2 | 3 | 2 |
| 2.5 | 4 | 4 | 4 | 2 | 2 | 2 | 2 | 2 | 3 | 1 | 1 | 1 |
| 1.25 | 2 | 2 | 5 | 1 | 1 | 1 | 1 | 1 | 1 | 1 | 1 | 1 |
| 0.31 | 1 | 1 | 5 | 1 | 1 | 1 | 1 | 1 | 1 | 1 | 1 | 1 |
| Product of Ex. 3: | | | | | | | | | | | | |
| Preemergence (lb./acre): | | | | | | | | | | | | |
| 20 | 5 | 5 | 5 | 5 | 2 | 2 | 5 | 5 | 5 | 5 | 5 | 4 |
| 10 | 5 | 3 | 5 | 3 | 1 | 1 | 5 | 2 | 2 | 2 | 4 | 2 |
| 5 | 5 | 3 | 5 | 3 | 1 | 1 | 4 | 5 | 2 | 2 | 4 | 2 |
| Postemergence (lb./acre): | | | | | | | | | | | | |
| 20 | 5 | 5 | 5 | 4 | 3 | 3 | 5 | 5 | 5 | 4 | 5 | 5 |
| 10 | 5 | 5 | 4 | 3 | 2 | 2 | 5 | 5 | 5 | 2 | 3 | 3 |
| 5 | 4 | 5 | 4 | 3 | 2 | 2 | 3 | 2 | 5 | 2 | 3 | 2 |
| Product of Ex. 4: | | | | | | | | | | | | |
| Preemergence (lb./acre): | | | | | | | | | | | | |
| 10 | 5 | 5 | 5 | 2 | 2 | 1 | 5 | 5 | 3 | 4 | 5 | 4 |
| 5 | 5 | 5 | 5 | 2 | 2 | 1 | 4 | 5 | 3 | 1 | 5 | 3 |
| 2.5 | 4 | 1 | 5 | 1 | 1 | 1 | 3 | 3 | 3 | 1 | 1 | 1 |
| 1.25 | 4 | 1 | 4 | 1 | 1 | 1 | 2 | 1 | 2 | 1 | 1 | 1 |
| 0.625 | 3 | 1 | 2 | 1 | 1 | 1 | 1 | 1 | 1 | 1 | 1 | 1 |
| Postemergence (lb./acre): | | | | | | | | | | | | |
| 10 | 5 | 5 | 5 | 3 | 3 | 4 | 3 | 3 | 4 | 3 | 5 | 4 |
| 5 | 5 | 5 | 5 | 3 | 1 | 2 | 2 | 3 | 4 | 1 | 5 | 2 |
| 2.5 | 3 | 5 | 4 | 2 | 2 | 2 | 1 | 2 | 3 | 1 | 1 | 1 |
| 1.25 | 2 | 2 | 5 | 1 | 1 | 2 | 2 | 1 | 1 | 1 | 1 | 1 |
| 0.625 | 2 | 2 | 4 | 1 | 1 | 2 | 1 | 1 | 1 | 1 | 1 | 1 |
| Product of Ex. 5: | | | | | | | | | | | | |
| Preemergence (lb./acre): | | | | | | | | | | | | |
| 20 | 5 | 5 | 5 | 5 | 1 | 1 | 5 | 5 | 5 | 4 | 5 | 4 |
| 10 | 5 | 5 | 5 | 3 | 1 | 1 | 4 | 5 | 4 | 4 | 5 | 4 |
| 5 | 5 | 5 | 4 | 3 | 1 | 1 | 3 | 5 | 2 | 2 | 4 | 2 |
| Postemergence (lb./acre): | | | | | | | | | | | | |
| 20 | 5 | 5 | 5 | 4 | 3 | 4 | 5 | 5 | 5 | 4 | 5 | 3 |
| 10 | 5 | 5 | 4 | 3 | 3 | 3 | 5 | 3 | 3 | 2 | 4 | 4 |
| 5 | 4 | 5 | 4 | 3 | 2 | 2 | 2 | 2 | 3 | 2 | 3 | 3 |
| Product of Ex. 7: | | | | | | | | | | | | |
| Preemergence (lb./acre): | | | | | | | | | | | | |
| 20 | 5 | 5 | 5 | 5 | 4 | 4 | 5 | 5 | 5 | 5 | 5 | 5 |
| 10 | 5 | 4 | 5 | 5 | 3 | 3 | 5 | 5 | 4 | 4 | 5 | 5 |
| 5 | 5 | 4 | 4 | 3 | 2 | 1 | 4 | 4 | 3 | 3 | 4 | 3 |
| 2.5 | 3 | 1 | 3 | 1 | 1 | 1 | 4 | 3 | 3 | 1 | 3 | 1 |
| 1.25 | 3 | 1 | 1 | 1 | 1 | 1 | 1 | 1 | 1 | 1 | 1 | 1 |
| Postemergence (lb./acre): | | | | | | | | | | | | |
| 20 | 5 | 5 | 5 | 4 | 3 | 4 | 5 | 5 | 5 | 3 | 5 | 5 |
| 10 | 5 | 5 | 5 | 5 | 3 | 3 | 4 | 5 | 5 | 2 | 4 | 4 |
| 5 | 5 | 5 | 4 | 3 | 2 | 3 | 3 | 3 | 4 | 2 | 4 | 3 |
| 2.5 | 3 | 4 | 3 | 3 | 1 | 1 | 1 | 1 | 1 | 2 | 3 | 1 |
| 1.25 | 3 | 3 | 1 | 1 | 1 | 1 | 1 | 1 | 1 | 1 | 1 | 1 |
| Product of Ex. 8: | | | | | | | | | | | | |
| Preemergence (lb./acre): | | | | | | | | | | | | |
| 20 | 5 | 5 | 5 | 5 | 2 | 2 | 5 | 5 | 2 | 5 | 5 | 5 |
| 10 | 5 | 4 | 4 | 2 | 1 | 1 | 5 | 5 | 2 | 2 | 5 | 3 |
| 5 | 4 | 5 | 5 | 2 | 1 | 1 | 3 | 5 | 2 | 3 | 4 | 2 |
| Postemergence (lb./acre): | | | | | | | | | | | | |
| 20 | 5 | 5 | 5 | 4 | 3 | 3 | 5 | 4 | 5 | 3 | 4 | 3 |
| 10 | 5 | 5 | 4 | 3 | 2 | 2 | 2 | 3 | 5 | 2 | 3 | 4 |
| 5 | 3 | 5 | 3 | 2 | 2 | 2 | 1 | 2 | 2 | 2 | 2 | 2 |

EXAMPLE 11

Separate lots of sterilized soil were inoculated with plant pathogens. The inoculated soil was placed in 4-ounce containers, and the soil in each container was drenched with 30 ml. of an aqueous suspension containing an amount of N - cycloheptyl-2,3,6-trichlorobenzylidenimine (Product of Example 4) sufficient to provide the desired dosage rate. After incubation for two days at 70° F., the amount of mycelial growth on the surface of the soil was noted. The results of the tests are given in Table II. In this table, a rating of "1" indicates growth equal to that in inoculated soil that had not been treated with fungicide; "2" indicates that about 75% of the surface was covered with colonies of the organism; "3" indicates that about 50% of the surface was covered with colonies of the organism; "4" indicates that a few scattered colonies were present; and "5" indicates no growth on the surface of the soil.

TABLE II.—ACTIVITY OF N-CYCLOHEPTYL-2,3,6-TRICHLOROBENZYLIDENIMINE AS SOIL FUNGICIDE

| Rate of application (lb./acre) | Plant pathogen | | | |
|---|---|---|---|---|
| | Sclerotium rolfsii | Pythium sp. | Rhizoctonia solani | Fusarium oxysporum |
| 300 | 4 | 4 | 3 | 5 |
| 150 | 1 | 4 | 1 | 2 |
| 75 | 1 | 4 | 1 | 2 |
| 37 | 1 | 3 | 1 | 1 |

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:

1. An N-cycloalkylchlorobenzylideneimine that has the structural formula

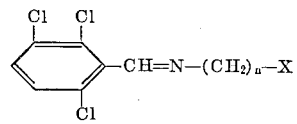

wherein $n$ represents an integer in the range of zero to four and X represents a cyclohexyl, cycloheptyl, cyclooctyl, bicyclo (2.2.1)-heptyl, or norbornyl group.

2. N-cyclohexyl-2,3,6-trichlorobenzylidenimine.

3. The compound as set forth in claim 1 wherein R is cyclohexyl and $n$ is one.

4. The compound as set forth in claim 1 wherein R is cyclohexyl and $n$ is four.

5. The compound as set forth in claim 1 wherein R is cycloheptyl and $n$ is zero.

6. The compound as set forth in claim 1 wherein R is cyclooctyl and $n$ is zero.

7. The compound as set forth in claim 1 wherein R is bicyclo(2.2.1)-heptyl and $n$ is one.

8. The compound as set forth in claim 1 wherein R is norbornyl and $n$ is zero.

References Cited
UNITED STATES PATENTS
3,253,022  5/1966  Linder et al. _____ 260—518
3,466,164  9/1969  De Gaetano et al. _____ 71—121
3,083,226  3/1963  Horrom et al. _____ 260—471

OTHER REFERENCES
Baddar et al.: J. Chemical Society (London), 1954 pp. 209–213.

LEON ZITVER, Primary Examiner

G. A. SCHWARTZ, Assistant Examiner

U.S. Cl. X.R.

71—121; 424—325